US011659030B2

(12) United States Patent
Nishida et al.

(10) Patent No.: US 11,659,030 B2
(45) Date of Patent: May 23, 2023

(54) SERVER MANAGEMENT SYSTEM, METHOD OF MANAGING SERVER, AND PROGRAM OF MANAGING SERVER

(71) Applicant: Hitachi, Ltd., Tokyo (JP)

(72) Inventors: Toshio Nishida, Tokyo (JP); Hideki Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 56 days.

(21) Appl. No.: 17/470,549

(22) Filed: Sep. 9, 2021

(65) Prior Publication Data

US 2022/0247813 A1 Aug. 4, 2022

(30) Foreign Application Priority Data

Feb. 1, 2021 (JP) ............................ JP2021-014354

(51) Int. Cl.
*G06F 15/173* (2006.01)
*H04L 67/1034* (2022.01)

(52) U.S. Cl.
CPC ................................ *H04L 67/1034* (2013.01)

(58) Field of Classification Search
CPC .................................................. H04L 67/1034
See application file for complete search history.

(56) References Cited

U.S. PATENT DOCUMENTS 6,128,657 A * 10/2000 Okanoya ............. H04L 67/1001 709/224
10,970,179 B1 * 4/2021 Ruslyakov .......... G06F 11/3006
2003/0005350 A1 * 1/2003 Koning ................... H04L 69/40 714/4.11
2007/0150594 A1 * 6/2007 Andreev ................. H04L 69/40 709/226
2015/0046511 A1 * 2/2015 Frerking ............. H04L 67/1012 709/203
2018/0205786 A1 * 7/2018 Dong .................... G06F 9/5077
(Continued)

FOREIGN PATENT DOCUMENTS

CN 100375434 C * 3/2008 ............. H04L 63/02
CN 101159539 A * 4/2008
CN 105743995 A * 7/2016 ......... H04L 41/0668
(Continued)

*Primary Examiner* — Richard G Keehn
(74) *Attorney, Agent, or Firm* — Baker Botts L.L.P.

(57) ABSTRACT

Provided is a server management system which selects an active system and a standby system by using multiple server resources managed by being divided into multiple categories in a predetermined standard and in which a service providing server is redundantly disposed, the system including: a selection information input unit acquiring selection information that is information necessary for selecting the category; a selection information storage unit storing the selection information input from the selection information input unit; a failure information storage unit storing failure information indicating a failure occurring in the category; a selection unit selecting an additional category based on an failure occurrence according to the active system and/or the standby system; and a selection result output unit outputting the category selected, in which the selection unit refers to the failure information with respect to a category satisfying a condition indicated by selection information and selects an additional category.

1 Claim, 12 Drawing Sheets

(56) References Cited

U.S. PATENT DOCUMENTS

2020/0104222 A1* 4/2020 Ramamoorthi ......... G06F 11/00

FOREIGN PATENT DOCUMENTS

| | | | | | |
|---|---|---|---|---|---|
| CN | 113497811 | A | * | 10/2021 | |
| CN | 110769019 | B | * | 5/2022 | ......... H04L 67/1034 |
| JP | 5285045 | B2 | * | 9/2013 | |
| JP | 2015-219795 | A | | 12/2015 | |
| WO | WO-2006074023 | A2 | * | 7/2006 | ............. H04L 67/06 |
| WO | WO-2010147164 | A1 | * | 12/2010 | ....... H04N 21/25891 |
| WO | WO-2018037535 | A1 | * | 3/2018 | .......... G06F 11/0709 |
| WO | WO-2018175864 | A1 | * | 9/2018 | ............ G06F 11/203 |

* cited by examiner

S
REGION SELECTION SYSTEM
100
REGION SELECTION INFORMATION INPUT UNIT
101
REGION SELECTION INFORMATION STORAGE UNIT
106
REGION SELECTION UNIT
107
REGION SELECTION RESULT OUTPUT UNIT
105
FAILURE INFORMATION STORAGE UNIT
104
FAILURE INFORMATION ACQUISITION UNIT
103
102
FAILURE INFORMATION PROVIDING SERVER

*FIG. 2*

| # | REGION SELECTION INFORMATION | SET VALUE |
|---|---|---|
| 1 | FAILURE TO BE EXTRACTED | ALL SERVICES |
| 2 | PERIOD OF FAILURE INFORMATION TO BE EXTRACTED | 2019/01/01～2020/09/30 |
| 3 | MANAGED SERVICES USED BY SERVICE PROVIDING SERVER | EC2, RDS |
| 4 | BASE REGION OF SERVICE PROVIDING SERVER | REGION A |
| 5 | PRIMARY REGION OF SERVICE PROVIDING SERVER | REGION A |
| 6 | SECONDARY REGION OF SERVICE PROVIDING SERVER | REGION B |
| 7 | AVAILABLE REGIONS UNDER LEGAL SYSTEM | REGION A, REGION B REGION D, REGION F |
| 8 | WAITING TIME | 24 HOURS |

FIG. 3

| # | ITEM | FAILURE INFORMATION 1 | FAILURE INFORMATION 2 | FAILURE INFORMATION 3 | |
|---|---|---|---|---|---|
| 1 | FAILURE OCCURRENCE REGION | REGION A | REGION D | REGION B | |
| 2 | MANAGED SERVICE WHERE FAILURE OCCURRED | EC2 | RDS | RDS | |
| 3 | DATE AND TIME OF FAILURE OCCURRENCE | 2019/10/01 12:00 | 2019/12/10 14:00 | 2020/03/20 1:00 | |
| 4 | DATE AND TIME OF FAILURE RECOVERY | 2019/10/01 14:00 | 2019/12/11 8:00 | 2020/03/20 4:00 | |

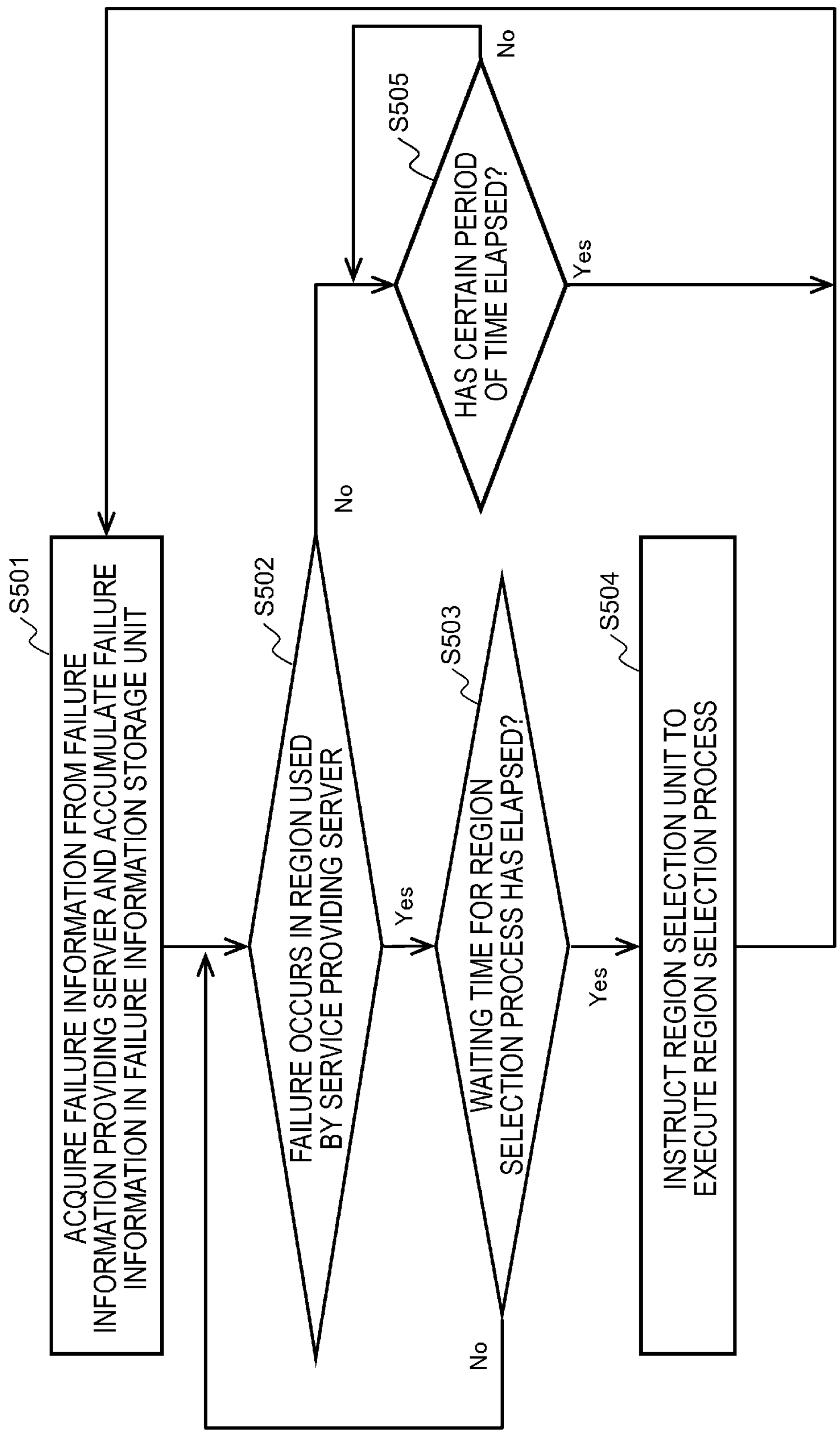
FIG. 5
S501
ACQUIRE FAILURE INFORMATION FROM FAILURE INFORMATION PROVIDING SERVER AND ACCUMULATE FAILURE INFORMATION IN FAILURE INFORMATION STORAGE UNIT
S502
FAILURE OCCURS IN REGION USED BY SERVICE PROVIDING SERVER
Yes
No
S503
WAITING TIME FOR REGION SELECTION PROCESS HAS ELAPSED?
Yes
No
S504
INSTRUCT REGION SELECTION UNIT TO EXECUTE REGION SELECTION PROCESS
S505
HAS CERTAIN PERIOD OF TIME ELAPSED?
Yes
No

FIG. 7

| # | ITEM | REGION A | REGION B | REGION C | |
|---|---|---|---|---|---|
| 1 | PERIOD OF FAILURE INFORMATION TO BE EXTRACTED [X DAYS] | 2019/01/01～2020/09/30 → 639 DAYS | | | |
| 2 | NUMBER OF TIMES OF FAILURE OCCURRENCE [Y TIMES] | THREE TIMES | TWICE | FIVE TIMES | |
| 3 | FAILURE OCCURRENCE RATE [Y / X] | 0.5% | 0.3% | 0.8% | |

FIG. 8

| # | LIST OF MANAGED SERVICES | MANAGED SERVICE PROVISION CIRCUMSTANCE | | | |
|---|---|---|---|---|---|
| | | REGION A | REGION B | REGION C | |
| 1 | SERVICE A | ○ | ○ | ○ | |
| 2 | SERVICE B | ○ | × | ○ | |
| 3 | SERVICE C | ○ | ○ | × | |
| ⋮ | ⋮ | ⋮ | ⋮ | ⋮ | |

S1001
ACQUIRE FAILURE INFORMATION FROM FAILURE INFORMATION STORAGE UNIT AND PREDICT FAILURE OCCURRENCE OF REGION USED BY SERVICE PROVIDING SERVER
S1002
IS FAILURE OCCURRENCE IN REGION USED BY SERVICE PROVIDING SERVER EXPECTED?
Yes
No
S1004
HAS CERTAIN TIME ELAPSED?
Yes
No
S1003
INSTRUCT REGION SELECTION UNIT TO EXECUTE REGION SELECTION PROCESS

FIG. 11

| # | ITEM | PRIMARY REGION | | | SECONDARY REGION | | |
|---|---|---|---|---|---|---|---|
| 1 | PERIOD OF FAILURE INFORMATION TO BE EXTRACTED [X DAYS] | 2019/01/01 ~06/30 → 181 DAYS | 2019/07/01 ~12/31 → 184 DAYS | 2020/01/01 ~06/30 → 182 DAYS | 2019/01/01 ~06/30 → 181 DAYS | 2019/07/01 ~12/31 → 184 DAYS | 2020/01/01 ~06/30 → 182 DAYS |
| 2 | NUMBER OF TIMES OF FAILURE OCCURRENCE [Y TIMES] | 0 TIMES | ONCE | TWICE | TWICE | 0 TIMES | 0 TIMES |
| 3 | FAILURE OCCURRENCE RATE [Y / X] | 0% | 0.5% | 1.1% | 1.1% | 0% | 0% |
| 4 | FAILURE OCCURRENCE RATE (COMPARED TO HALF A YEAR AGO) | — | +0.5% | +0.6% | — | −1.1% | ±0% |

5000
COMPUTER
5100
NETWORK INTERFACE
5200
I/O CONTROLLER
5300
PROCESSOR
5400
MEMORY
5500
MEMORY CONTROLLER
5600
INPUT DEVICE
5700
OUTPUT DEVICE
5800
EXTERNAL STORAGE DEVICE

SERVER MANAGEMENT SYSTEM, METHOD OF MANAGING SERVER, AND PROGRAM OF MANAGING SERVER

BACKGROUND OF THE INVENTION

1. Field of the Invention

The present invention relates to a server management system, a method of managing a server, and a program of managing a server.

2. Description of Related Art

In cloud services, computing resources such as servers, storages, and applications (hereinafter referred to as managed services) are provided via the Internet, systems are freely built by using these resources, so that services can be provided on the cloud. Functions such as server augmentation and load sharing in system operations are also provided, and system management costs and operational burden can be significantly reduced compared to on-premises operation. As a result, many companies provide services using the cloud.

On the other hand, in cloud vendors, large-scale failures have occurred in the past, and there have been cases where user systems using the failed regions and resources have stopped. Therefore, the cloud vendors are suggested to build configurations such as multi-availability zone (AZ) and multi-region to make the system redundant by disposing the system at multiple bases in order to realize continuous operation of the system in the event of a failure and perform operations. For example, in the case of a multi-region configuration, a region where the system that becomes a master environment (operating system) is disposed is set as a primary region, and the region where a redundant system that becomes a slave environment (standby system) is disposed is set as a secondary region. If a failure occurs in the primary region, a failover function that automatically promotes the secondary region to the primary region is also provided to embody a continuous system operation in the event of a failure.

Here, an operation of a user system that uses a managed service provided by a cloud service in a multi-region configuration is considered. If a failure occurs in the primary region, the secondary region becomes the primary region and the system continuously operates. Here, the operation is performed in a single region, so it is necessary to dispose a redundant system in a new region and build a secondary region in case of further region failure. However, the managed services that can be provided differ depending on the region, and it is necessary to select a region that can provide the managed services used by the user system. The function to meet such need is not provided by the cloud vendor, but manually implemented, and thus requires man-hours. JP-A-2015-219795 is a method for reducing burden. JP-A-2015-219795 states, "When a system configuration is performed by combining a plurality of components that involve communication between data centers of a cloud service provider, a system configuration proposal that considers the requirements for communication between data centers in addition to the component requirements desired by the user can be generated."

JP-A-2015-219795 discloses a method of generating a system configuration plan considering the component requirements desired by the user, and it is considered that the selection of a region where the managed service used by the user system can be provided can be embodied. However, from the viewpoint of improving availability, it is necessary to select a high utilization region in consideration of the failures occurring in the past. JP-A-2015-219795 does not consider region selection based on the failure occurrence. Therefore, when a region with frequent failures is selected, system reconstruction work may be repeatedly required.

As described above, in a multi-region configuration, if a failure occurs in the primary region, the secondary region becomes the primary region, and the system continuously operates, but the primary region is not necessarily an optimum region for the user system. For example, when the user system provides services for the domestic market, it is assumed that a multi-region configuration in which the primary region is the domestic region, and the secondary region is the foreign region where the resource usage fee is low is formed. If a failure occurs in the primary region here, the foreign region is promoted to the primary region and works as the master environment of the user system, to continue the service. Here, the service provided from the foreign region is used by a domestic user, and thus the latency increases. Therefore, in a system operation in a multi-region configuration, it is also necessary to monitor the appropriateness of the primary region. It should be noted that such a problem occurs when a redundant configuration is constructed by using a plurality of server resources managed by being divided into a plurality of categories based on a predetermined standard such as a cluster, not limited to a region.

SUMMARY OF THE INVENTION

Therefore, one object of the present invention is to embody the selection of a category according to the occurrence status of a failure in each division in a system using a plurality of server resources managed by being divided into a plurality of categories according to a predetermined standard.

In order to solve such a problem, in the present invention, one aspect is a server management system which selects an active system and a standby system from different categories by using a plurality of server resources managed by being divided into a plurality of categories in a predetermined standard and in which a service providing server is redundantly disposed, the system including: a selection information input unit which acquires selection information that is information necessary for selecting the category; a selection information storage unit which stores the selection information input from the selection information input unit; a failure information storage unit which stores failure information indicating a failure occurring in the category; a selection unit which newly selects an additional category based on an occurrence situation of the failure according to the active system and/or the standby system; and a selection result output unit which outputs the category selected by the selection unit, in which the selection unit refers to the failure information with respect to a category satisfying a condition indicated by the selection information and selects an additional category.

According to the present invention, in a system using a plurality of server resources managed by being divided into a plurality of categories in a predetermined standard, the selection of categories according to the occurrence situation of the failures of the category can be embodied.

BRIEF DESCRIPTION OF THE DRAWINGS

FIG. 2 is a diagram illustrating a specific example of information of a region selection information storage unit in Example 1;

FIG. 3 is a diagram illustrating a specific example of information of a failure information storage unit in Example 1;

FIG. 5 is an example of a flowchart illustrating a flow of a period acquisition process of the failure information and a region selection execution instruction to the region selection unit by the failure information acquisition unit in Example 1;

FIG. 7 is a diagram illustrating a calculation example of a failure occurrence rate in Example 1;

FIG. 8 is a diagram illustrating an example of the managed service provision situation for each region in Example 1;

FIG. 11 is a diagram illustrating an example of a method of predicting failure occurrence in Example 2.

DESCRIPTION OF EMBODIMENTS

Figure 1:
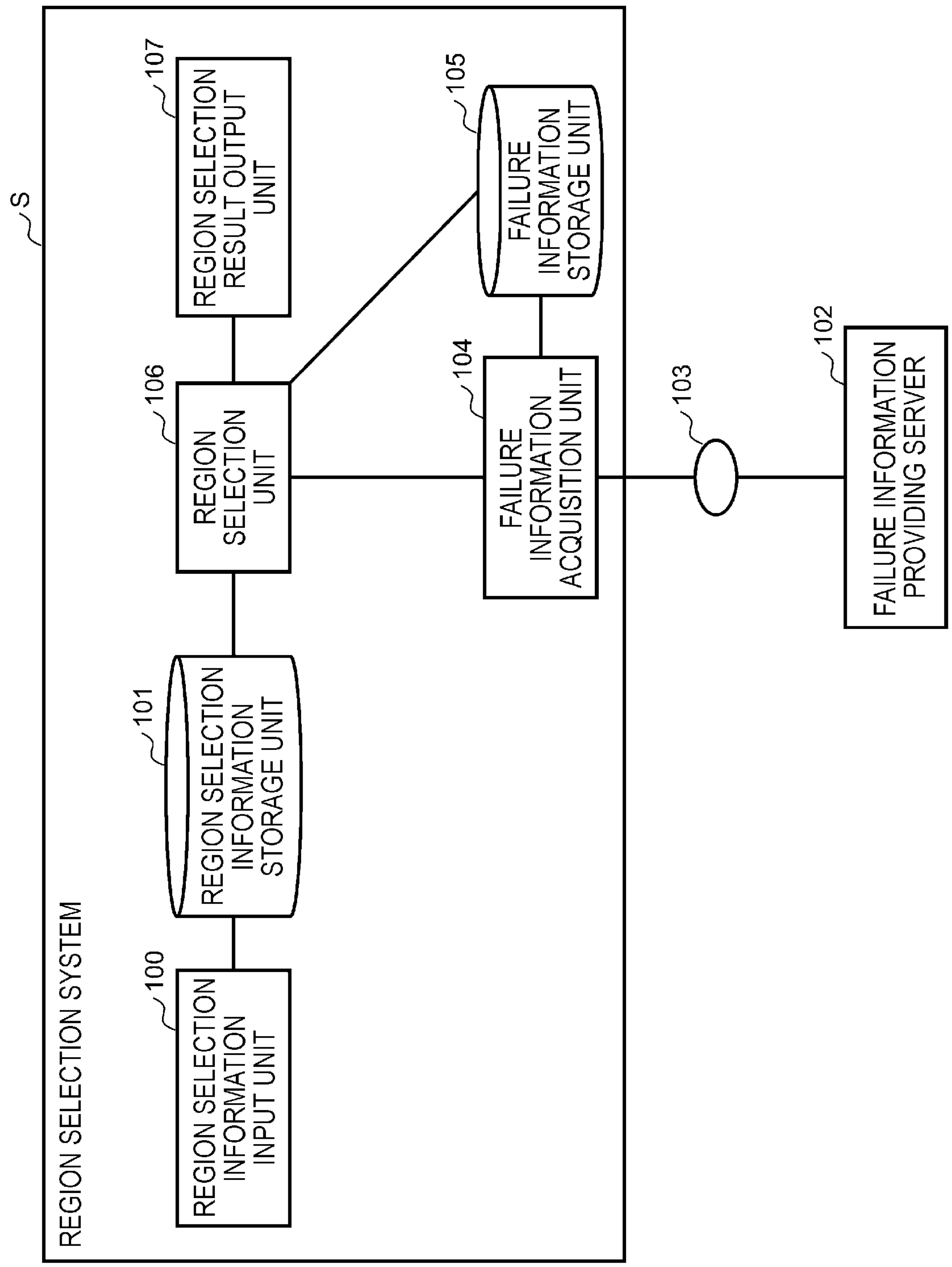
FIG. 1 is a diagram illustrating a functional configuration example of a region selection system in Example 1.

Hereinafter, examples are described with reference to the drawings. The following is merely an example of embodiments, and it is not intended to limit the invention itself to the following specific contents.

In the following description, the same or similar elements and processes are denoted by the same reference numerals, and duplicate description thereof is omitted. In the examples described below, only the differences from the existing examples are described, and duplicate explanations thereof are omitted.

The following description of the examples and configurations and processes illustrated in the drawings show the outline of the examples to the extent necessary for understanding and implementing the present invention, and are not intended to limit the embodiments according to the present invention. Each example and each modification can be combined in part or in whole within a range consistent with each other without departing from the spirit of the present invention.

Example 1

According to the present example, in a system configured with a first region where a user system is disposed and a second region where a user system is redundantly disposed, when a region failure occurs, a process of selecting a region with a high occupancy rate where a managed service that uses a user system can be provided as a region to be newly used, determining whether a region where a failure does not occur is a region appropriate for providing a service, and executing region selection again is provided.

First, a functional configuration example of a region selection system S that is a server management system according to the present example is described by using FIG. 1. FIG. 1 is a diagram illustrating a functional configuration example of the region selection system S in Example 1. As illustrated in FIG. 1, the region selection system S is configured to include a region selection information input unit 100, a region selection information storage unit 101, a failure information acquisition unit 104, a failure information storage unit 105, a region selection unit 106, and a region selection result output unit 107. A failure information providing server 102 and a network 103 are described as cooperation units for the region selection system S to acquire a region failure.

First, information registration to the region selection information storage unit 101 by the region selection information input unit 100 is described. The region selection information input unit 100 corresponds to information input by a user who uses the region selection system S, information input according to a function that configures the region selection system S, and information input by a user system (hereinafter, referred to as a service providing server) to be a target of region selection.

Here, information of the region selection information storage unit 101 according to the present example is described with reference to FIG. 2. FIG. 2 is a diagram illustrating a specific example of information of a region selection information storage unit in Example 1. As illustrated in FIG. 2, information necessary for region selection is stored in the region selection information storage unit 101. In the present example, a region with a high occupancy rate based on the failure information that occurred in the past is selected.

1 "Failure to be extracted" is to set a type of failure information to be used. In addition to setting all managed service failures to be a target, any setting such as setting of only a managed service to be used by a service providing server as a target can be made.

2 "Period of failure information to be extracted" enables any setting in a period of the failure information to be used.

3 "Managed service used by service providing server" is to set a managed service necessary for an operation of a service providing server and to select a region where a managed service set here can be provided with respect to the region selection. Here, examples thereof include elastic compute cloud (EC2) and relational database service (RDS), which are examples of a managed service provided by a cloud vendor.

4 "Base region of service providing server" is to set a base to which the service providing server provides a service and aims latency reduction by selecting a region set here or a region in a suburb with respect to the region selection.

5 "Primary region of service providing server" and #6 "Secondary region of service providing server" are to set information of a region where the service providing server is currently disposed and to select a region other than a region set here with respect to the new region selection.

7 "Available regions under legal system" is to perform setting when only a specific region is available for legal reasons. For example, in Europe, there is a law called general data protection regulation (GDPR) that protects personal data leakage outside Europe. If the service providing server includes data to be protected by GDPR, it is required to select a new region from regions in Europe. If such a countermeasure is required, the available region is set to be used for region selection.

8 "Waiting time" is a time to wait from detection of failure to a start of new region selection. That is, the waiting time is a time to wait without performing a region selection process assuming that the failure is to be recovered in a short period of time.

As described above, the information of #1 to #8 may be set by any input of input by a user who uses the region selection system S, input by a function that configures the region selection system S, or input by a service providing server to be a target of region selection. A default value may be set in advance, to be used when no setting is made.

Subsequently, the information registration to the failure information storage unit 105 by the failure information acquisition unit 104 is described. The failure information acquisition unit 104 acquires region failure information from the failure information providing server 102 connected to the region selection system S by the Internet via the network 103, extracts information necessary for region selection, and sets the information to the failure information storage unit 105. By periodically executing such process, the failure information in the past is accumulated in the failure information storage unit 105.

Here, the information of the failure information storage unit 105 in the present example is described by using FIG. 3. FIG. 3 is a diagram illustrating a specific example of information of a failure information storage unit in Example 1. As illustrated in FIG. 3, the failure information in the past is stored in the failure information storage unit 105. In the present example, a region with a high occupancy rate is selected based on the failure information that occurred in the past. A unit that stores information to be used here is the failure information storage unit 105.

1 "Failure occurrence region" is to set a region where the failure occurs.

2 "Managed service where failure occurred" is to set a specific managed service in which the failure occurs.

3 "Date and time of failure occurrence" is to set date and time when the failure occurs.

4 "Date and time of failure recovery" is to set date and time of recovery from the failure.

Finally, the region selection by the region selection unit 106 is described. The process of the region selection unit 106 is executed at an opportunity to acquire failure information relating to a region where the service providing server is disposed in the failure information acquisition process from the failure information providing server 102 by the failure information acquisition unit 104.

The region selection unit 106 acquires the failure information stored in the failure information storage unit 105, uses the information stored in the region selection information storage unit 101, and performs calculation of an occupancy rate per region and filtering of a selected region, to select a region with a high occupancy rate where a managed service using the service providing server can be provided. Among regions where the service providing servers are disposed, a region where the failure does not occur is also determined whether to be a region appropriate for providing the service, and the region is selected, as necessary.

A region selected by the region selection unit 106 is output via the region selection result output unit 107. The output destination may be a screen display or text output for a user who uses the region selection system S, or the environment may be automatically constructed by outputting the region to a system for constructing the service providing server in the selected region.

Figure 4:
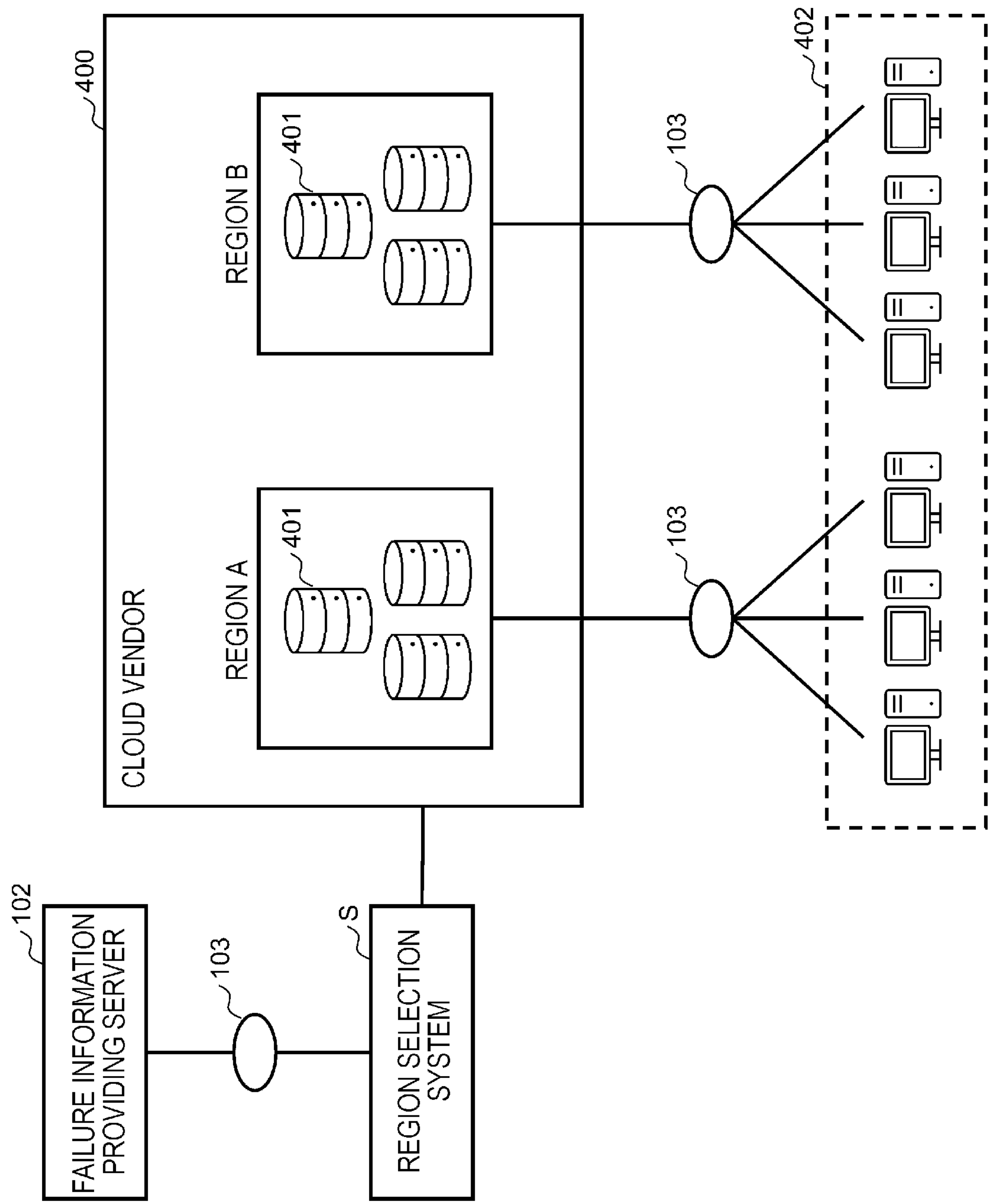
FIG. 4 is a diagram illustrating a specific example to which the region selection system in Example 1 is applied.

Here, an example in which the configuration of the region selection system S in the present example is embodied is described with reference to FIG. 4. FIG. 4 is a diagram illustrating a specific example to which the region selection system in Example 1 is applied. Here, a case where the service providing server to be a target of the region selection by the region selection system S is constructed on a cloud vendor 400 is provided as an example. The service providing servers are disposed in a region A and a region B provided by the cloud vendor 400 for redundancy, and operate in a data center 401 installed in each region.

A user who uses a provided service of the service providing server uses a service via the network 103 by using a service-using user terminal 402. An access from the service-using user terminal 402 to the service providing server on the cloud vendor 400 is controlled by the cloud vendor 400, and dynamically sorted to the region A or the region B according to the installation location of the service-using user terminal 402 or the number of simultaneous accesses. As a result, if a failure occurs in one region, the access is switched to the service providing server operating in the other region, so that the service can be continuously provided without giving the influence of the failure to the service-using user terminal 402. However, if the failure occurs in one region, the service is provided in a single region. Therefore, in preparation for failure in a further region, the region selection system S has a role of reconstructing redundant system in a new region.

Subsequently, an example of a flow of a process of a region selection system in the present example is described with reference to flowcharts of FIGS. 5 and 6.

FIG. 5 is an example of a flowchart illustrating a flow of a period acquisition process of the failure information and a region selection execution instruction to the region selection unit by the failure information acquisition unit in Example 1. For example, the period acquisition process of the failure information is periodically executed at regular intervals.

First, the failure information acquisition unit 104 acquires the failure information by an access to the failure information providing server 102 via the network 103 and accumulates the information in the failure information storage unit 105 (S501). If the failure information in a region used by the service providing server is acquired in S501 (Yes in S502), the failure information acquisition unit 104 determines whether the waiting time of the region selection process has elapsed (S503). If the waiting time has not elapsed (No in S503), the failure information acquisition unit 104 returns to S502. If the waiting time has elapsed (Yes in S503), the failure information acquisition unit 104 instructs the region selection unit 106 to execute the region selection process (S504).

Meanwhile, if the failure information is not acquired in the region used by the service providing server in S501 (No in S502), the failure information acquisition unit 104 determines whether a certain period of time has elapsed (S505). After a certain period of time has elapsed (Yes in S505), the failure information acquisition unit 104 acquires the failure information by an access to the failure information providing server 102 via the network 103 again and accumulates information in the failure information storage unit 105 (S501). Accordingly, the periodical acquisition of the failure information at a predetermined interval and the detection of the failure information in a region where the service providing server is used are embodied.

Figure 6:
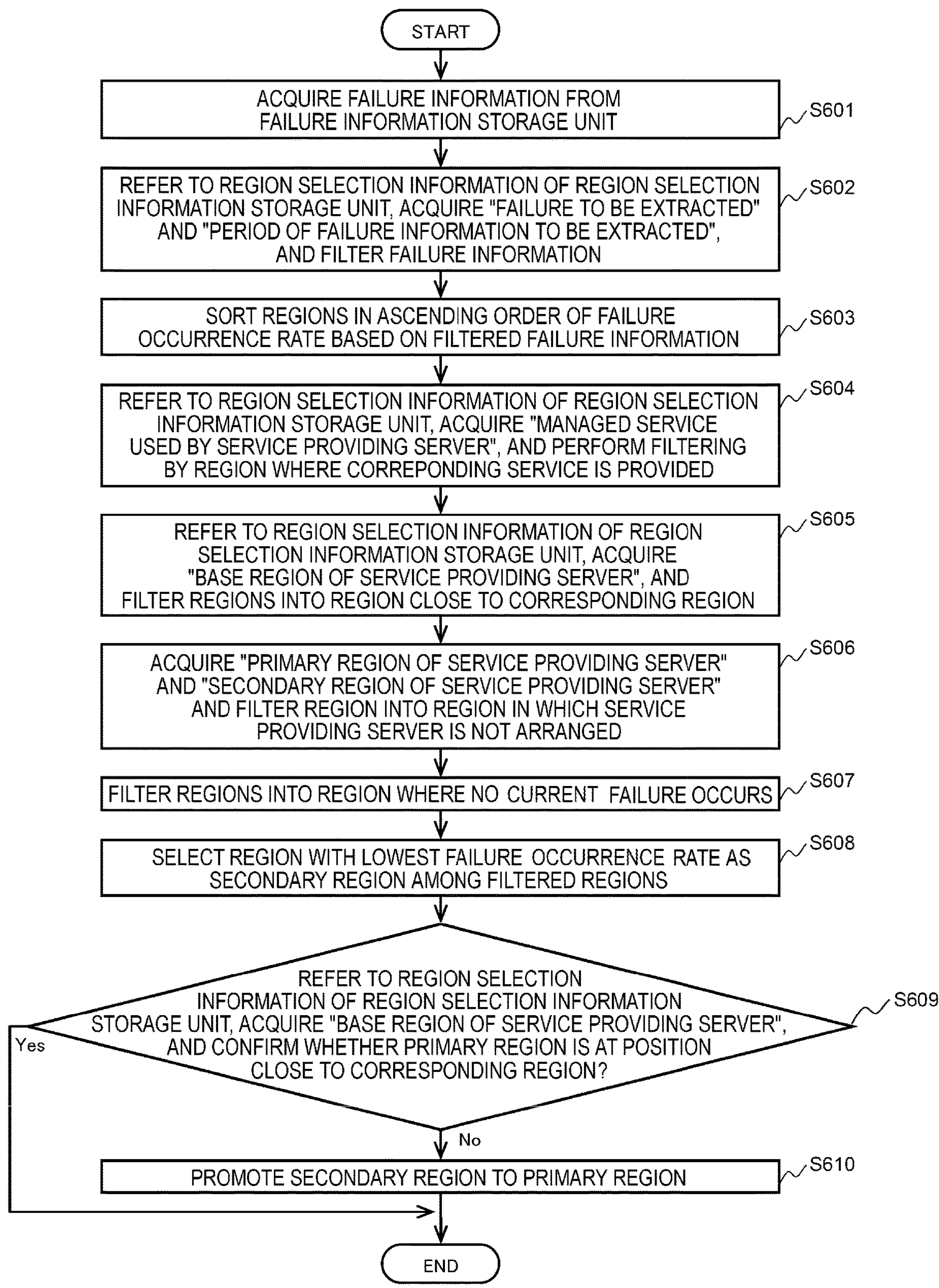
FIG. 6 is an example of a flowchart illustrating a flow of a region selection process by the region selection unit in Example 1.

FIG. 6 is an example of the flowchart illustrating the flow of the region selection process by the region selection unit in Example 1. The present flowchart is executed at an opportunity of an instruction of executing the region selection process by the failure information acquisition unit 104 described above (S503). In the present example, the region selection when the failure occurs in the primary region is described. As a situation, the region selection process in a state in which the failure occurs in the primary region, the secondary region is promoted to the primary region, and the service providing server operates in a single region is assumed.

First, the region selection unit 106 acquires the failure information from the failure information storage unit 105 (S601). Subsequently, with reference to the region selection information of the region selection information storage unit 101, #1 "Failure to be extracted" and #2 "Period of failure information to be extracted" are acquired, and the failure information acquired in S601 is filtered based on the information (S602). Subsequently, the failure occurrence rate for each region is calculated based on the filtered failure information and sort the regions in an ascending order of the failure occurrence rate (S603).

Here, the method of calculating the failure occurrence rate is described with reference to FIG. 7. FIG. 7 is a diagram illustrating a calculation example of the failure occurrence rate in Example 1. First, from #2 "Period of failure information to be extracted" acquired in S602, the number of days (X days) is calculated. Subsequently, the number of times of failure occurrence (Y times) of each region is calculated from the failure information filtered in S602. The failure occurrence rate is calculated by calculating Y/X.

In S603, the sorting is performed by using the failure occurrence rates obtained in this manner. Subsequently, with reference to region selection information of the region selection information storage unit 101, #3 "Managed service used by service providing server" is acquired, and filter a region list sorted in an ascending order of the failure occurrence rates in S603 by a region where the corresponding service is provided (S604).

The information used for the filtering in S604 is described by using FIG. 8. FIG. 8 is a diagram illustrating an example of the managed service provision situation for each region in Example 1. As such, a list obtained by linking managed services and available regions is prepared in advance and stored in the region selection system S. For example, the list may be stored in the region selection information storage unit 101. In S604, the filtering is performed by using the list.

Subsequently, with reference to the region selection information of the region selection information storage unit 101, #4 "Base region of service providing server" is acquired, and the region list filtered in S604 is filtered to a region close to the corresponding region (S605). The region close to the corresponding region is a region present in a suburb area, and the Tokyo region and the Osaka region in Japan are suburb regions, the North California region and the Oregon region in Western United States are suburb regions, and the like.

In #4 "Base region of service providing server", the service providing server is a base that is desired to provide the service. Therefore, the latency can be reduced by selecting a region close thereto. Subsequently, with reference to the region selection information of the region selection information storage unit 101, #5 "Primary region of service providing server" and #6 "Secondary region of service providing server" are acquired, and the region list filtered in S605 is filtered by a region where the service providing server is not disposed, so that a new region can be selected (S606).

Subsequently, with reference to the failure information storage unit 105, the list is filtered by a region where the failure does not currently occur (S607). As a result of the filtering of S607, the region with the lowest failure occurrence rate in the remaining region list is selected as a newly secondary region (S608).

Here, the region which is set as the primary region has operated as the secondary region before the failure occurs. If the secondary region is set because resource usage fee is low, or the like, a situation in which a service provided from a foreign region may be used by a domestic user may be possible, and in such a case, the latency increases. Here, with reference to the region selection information of the region selection information storage unit 101, #4 "Base region of service providing server" is acquired, and it is checked whether a current primary region is a region close to the corresponding region (S609).

If the current primary region is a suburb region (Yes in S609), the region selection process ends. Meanwhile, if the current primary region is not a suburb region (No in S609), the secondary region is promoted to the primary region (S610). Here, the region singly operated as the primary region is demoted to the secondary region.

The performance of a region selected in advance as the secondary region may have been reduced with an emphasis on cost, and thus even if the region is promoted from the secondary region to the primary region, a case where a newly selected region has more favorable performance may occur. In such a case, a region originally selected as the secondary region is returned to the secondary region, and the newly selected region is used as the primary region.

According to the present example, in a system configured with the first region where the service providing server is disposed and the second region where the service providing server is redundantly disposed, when the region failure occurs, a region with a high occupancy rate where the managed service using the service providing server can be provided can be selected as a region to be newly used. It is determined that whether the region where the failure does not occur is a region that is appropriate for the service provision and can execute the optimum region selection as necessary.

Example 2

According to the present example, in a system configured with a first region where a user system is disposed and a second region where a user system is redundantly disposed, a process of selecting a region with a high occupancy rate where a managed service using a user system can be provided as a region to be newly used when occurrence of a region failure is expected, determining whether a region where a failure does not occur is a region appropriate for service provision, and executing the region selection again.

Figure 9:
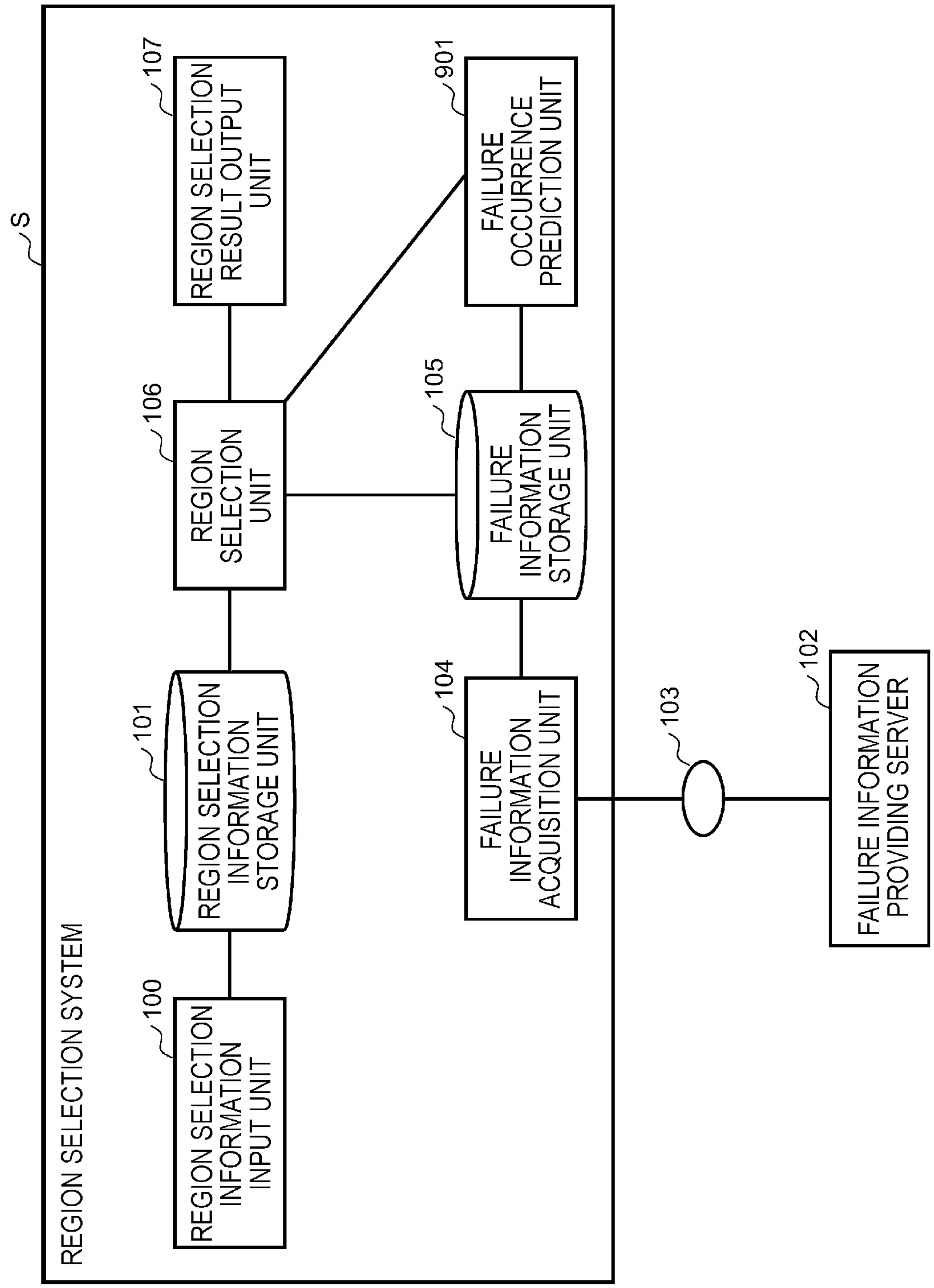
FIG. 9 is a diagram illustrating a functional configuration example of the region selection system in Example 2.

First, a functional configuration example of the region selection system S according to the present example is described with reference to FIG. 9. FIG. 9 is a diagram illustrating a functional configuration example of the region selection system S in Example 2. In comparison with FIG. 1 that is the functional configuration example of the region selection system S in Example 1, the region selection system S in Example 2 is different in that a failure occurrence prediction unit 901 is included, and the others are the same.

In Example 1, the configuration in which the process of the region selection unit 106 is executed at the opportunity of acquiring the failure information relating to the region where the service providing server is disposed, in the failure information acquisition process from the failure information providing server 102 by the failure information acquisition unit 104 is provided. However, the present example is different in that the failure occurrence prediction unit 901 predicts the occurrence of the failure based on the information of the failure information storage unit 105, and a region selection process is executed by the region selection unit 106 when the failure in the region where the service providing server is disposed is expected. Hereinafter, only the difference is described.

Figure 10:
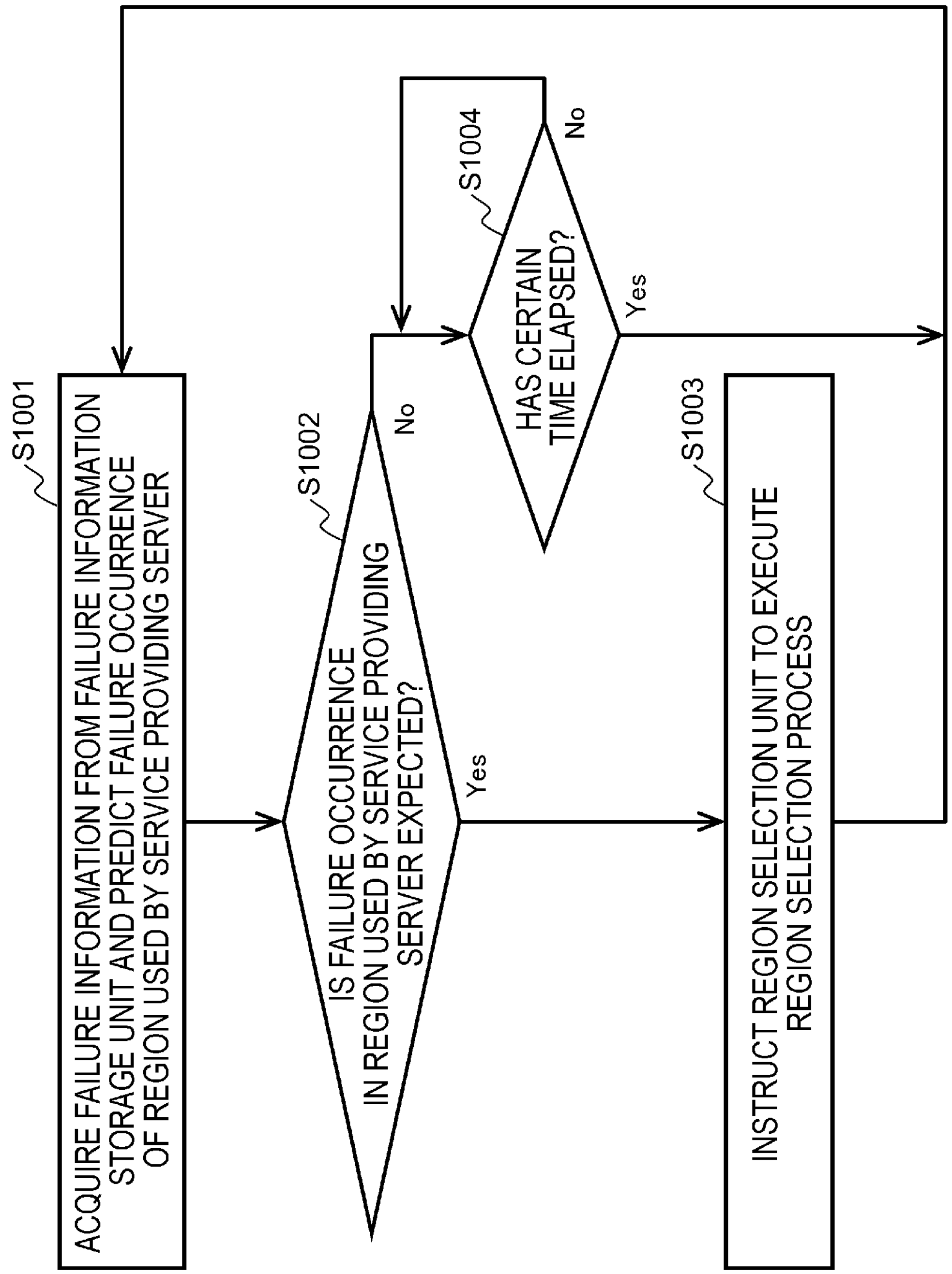
FIG. 10 is an example of a flowchart illustrating a flow of a period prediction process of failure occurrence by the failure occurrence prediction unit and the region selection execution instruction to the region selection unit in Example 2.

An example of a flow of a process of the region selection system according to the present example is described with reference to a flowchart of FIG. 10. FIG. 10 is an example of a flowchart illustrating a flow of a period prediction process of failure occurrence by the failure occurrence prediction unit and the region selection execution instruction to the region selection unit in Example 2. The period prediction process of the failure occurrence is periodically executed at regular intervals. First, the failure occurrence prediction unit 901 predicts failure occurrence in a region where the service providing server is used by acquiring failure information from the failure information storage unit 105 (S1001).

Here, a method of predicting failure occurrence is described with reference to FIG. 11. FIG. 11 is a diagram illustrating an example of a method of predicting failure occurrence in Example 2. First, the number of times of failure occurrence in the primary region and the secondary region for each half a year is calculated based on the failure information stored in the failure information storage unit 105. In FIG. 11, a result obtained by setting 2019/01/01 to 2019/06/30 as a first period, 2019/07/01 to 2019/12/31 as a second period, and 2020/01/01 to 2020/06/30 as a third period and calculating the numbers of days of the periods (X days) and the numbers of times of failure occurrence in the periods (Y times) is provided. A failure occurrence rate is calculated by calculating Y/X, to obtain the increase and decrease in the failure occurrence rate as a half-year-old ratio.

The failure occurrence of the region is predicted from the increase and decrease of this failure occurrence rate. For example, in the primary region, the half-year-old ratio of the failure occurrence rate tends to increase, and thus it is considered that failure occurrence in the future is expected. Meanwhile, in the secondary region, the half-year-old ratio of the failure occurrence rate tends to decrease, and thus it is considered that failure hardly occurs in the future. As such, in S1001, the failure occurrence can be predicted.

If the failure occurrence is expected in a region where the service providing server is used in S1001 (Yes in S1002), the failure occurrence prediction unit 901 instructs the region selection unit 106 to execute the region selection process (S1003).

Meanwhile, if it is determined that a failure hardly occurs in the region where the service providing server is used in S1002 (No in S1002), the failure occurrence prediction unit 901 determines whether a certain period of time has elapsed (S1004). After a certain period of time has elapsed (Yes in S1004), the failure occurrence prediction unit 901 predicts failure occurrence in the region where the service providing server is used by acquiring the failure information from the failure information storage unit 105 again (S1001). Accordingly, periodical failure occurrence prediction at a predetermined interval is embodied.

When the region selection unit 106 is instructed to execute the region selection process in S1003, the region selection unit 106 executes the region selection process based on the flowchart illustrated in FIG. 6.

According to the present example, in the system configured with the first region where the service providing server is disposed and the second region where the service providing server is redundantly disposed, when the region failure is expected to occur, the region with a high occupancy rate where the managed service using the service providing server is provided can be selected as a region to be newly used.

It is possible to determine whether a region where a failure does not occur is a region appropriate for service provision, so that the optimum region selection can be executed, as necessary.

According to the present example, selection of the primary region is provided, but the secondary region can be selected in the same manner based on the failure occurrence prediction. Here, conditions of the selection may be different from the primary region to the secondary region.

In FIG. 5 of Example 1 and FIG. 10 of Example 2, execution of a periodic process is illustrated, but the interval thereof set in advance by a provider of the region selection system S may be used, and also a user of the region selection system S may set and change the interval arbitrarily. A method of setting the interval arbitrarily can be embodied by providing an area for storing an execution interval of a periodic process in the region selection information storage unit 101 and reading the information by the failure information acquisition unit 104 that executes the periodic process or the failure occurrence prediction unit 901. Here, a method of storing an execution interval of the periodic process in the region selection information storage unit 101 can be embodied by an input operation from the region selection information input unit 100 by the user of the region selection system S. The selection can be started at an opportunity of the occurrence of failover from the primary region to the secondary region.

In the above examples, the specific example to which the region selection system S is applied is illustrated in FIG. 4. In the description, the example of the service providing server to be a target of the region selection by the region selection system S is provided, but as the public cloud service, any cloud service can be used.

In the above examples, the region selection system based on the occurrence of the failure and occurrence prediction in the region is provided. However, the occurrence of the failure, the occurrence prediction, and the environment reconstruction method may be applied to locations other than the regions and may be applied, for example, to redundant configuration reconstruction of an availability zone that is an independent location in the region. In addition to a physical location such as the region or the availability zone, the occurrence of the failure, the occurrence prediction, and the environment reconstruction method may be applied to a redundant configuration reconstruction of a virtual aggregate such as a cluster.

Figure 12:
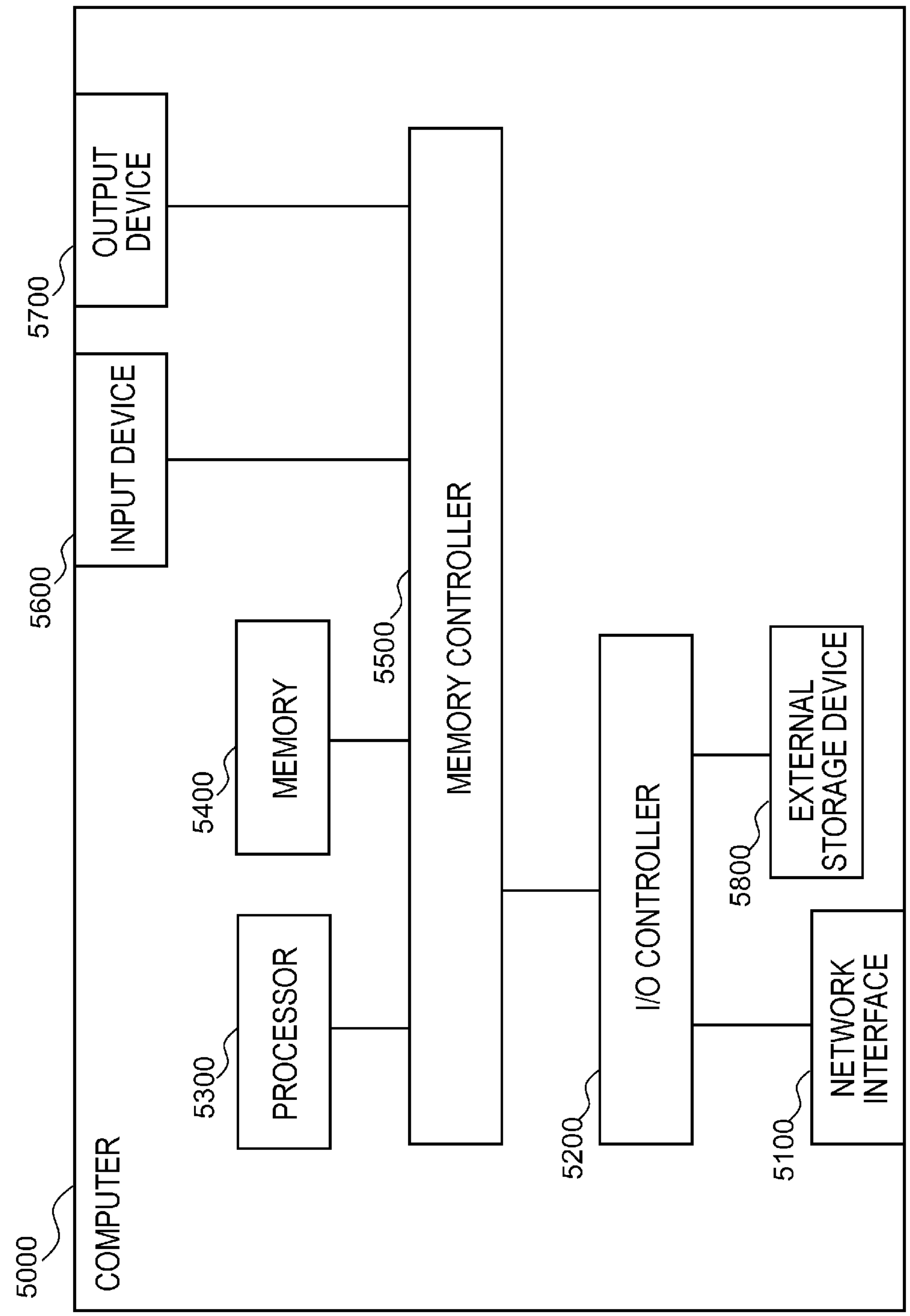
FIG. 12 is a diagram illustrating a hardware example of a computer that embodies the region selection system.

FIG. 12 is a diagram illustrating a hardware example of a computer that embodies the region selection system S. In a computer 5000 that embodies the region selection system S, a processor 5300 represented by a central processing unit (CPU), a memory 5400 such as a random access memory (RAM), an input device 5600 (for example, a keyboard, a mouse, and a touch panel), and an output device 5700 (for example, a video graphic card connected to an external display monitor) are interconnected via a memory controller 5500.

In the computer 5000, a predetermined program is read from an external storage device 5800 such as an SSD or an HDD via an input/output (I/O) controller 5200 and is executed in cooperation with the processor 5300 and the memory 5400, to embody the region selection system S.

Otherwise, each program that embodies the region selection system S may be acquired from an external computer by communication via a network interface 5100. Otherwise, the program for embodying the region selection system S may be stored in a portable storage medium, read by a medium reading device, and executed in cooperation with the processor 5300 and the memory 5400.

As described above, the region selection system S that is a server management system according to the examples is a server management system that uses a plurality of server resources managed by being divided into a plurality of categories, according to a predetermined standard, selects an active system and a standby system from different categories, and redundantly disposes the service providing server, and the region selection system includes the region selection information input unit 100 that acquires selection information that is information necessary for selection of the category, the region selection information storage unit 101 that stores selection information input from the region selection information input unit 100, the failure information storage unit 105 that stores failure information indicating a failure occurring in the category, the region selection unit 106 that newly selects an additional category based on an occurrence situation of a failure according to the active system and/or the standby system, and the region selection result output unit 107 that outputs the category selected by the region selection unit 106.

The region selection unit 106 refers to the failure information with respect to the category that satisfies a condition indicated by the selection information, and selects an additional category.

According to the configuration and the operation, in a system using a plurality of server resources managed by being divided into a plurality of categories in a predetermined standard, the selection of categories according to the occurrence situation of the failures of the category can be embodied.

The categories are regions obtained by grouping geographical ranges, and the region selection unit 106 sorts the regions in an ascending order of failure occurrence rates based on failure information stored in the failure information storage unit at an opportunity of the occurrence of a region failure in a region of the active system and/or a region of the standby system, satisfies a condition indicated by the selection information, and selects a region with the lowest failure occurrence rate obtained by filtering the regions by a region where a failure does not occur.

Therefore, when the failure information of the region is disclosed to the active system or the standby system, additional region can be selected quickly, and an operation in a single region can be prevented.

The region selection unit 106 compares an additional region selected at an opportunity of the occurrence of the failure in the region of the active system and a region selected as the standby system in advance and sets any region as a new active system.

The active system and the standby system may be selected with different standards, for example, the standby system is emphasized on cost than performance. According to the present configuration, if a region newly selected at an opportunity of the failure information exhibits higher performance than the region selected as the standby system, the newly selected region can be promoted to the active system.

The region selection unit 106 can use a value obtained by calculating the number of times of failure occurrence for a certain period in the past for each region as the failure occurrence rate.

The region selection unit 106 can use a value obtained by calculating failure occurrence time for a certain period in the past for each region as the failure occurrence rate.

As such, the failure occurrence rate can be obtained in any calculation.

The region selection unit 106 can perform filtering based on a type of a failure and/or a period designated to be extracted by the selection information.

The region selection unit 106 can perform filtering by a region with a communication distance close to a base region designated by the selection information.

The region selection unit 106 can perform filtering of a region satisfying a restriction under a legal system designated by the selection information.

As such, the filtering can be performed with any index.

The failure occurrence prediction unit 901 that predicts failure occurrence from the failure information stored in the failure information storage unit is included, and the region selection unit 106 may be configured to select an additional category if failure occurrence of the category used by service providing server is predicted by the failure occurrence prediction unit 901.

According to the configuration, a region can be added before the failure occurs.

The present invention is not limited to the above embodiments and includes various modifications. For example, the above embodiments are described in detail in order to explain the present invention for easier understanding, and is not limited to the one necessarily including all the configurations described. A part of a configuration of one embodiment can be replaced with a configuration of another embodiment, and a configuration of another embodiment can be added to a configuration of one embodiment. Addition, deletion, and replacement of another configuration can be made with respect to a part of a configuration of each embodiment. Each step in the processing of each embodiment may be executed by changing an order appropriately as long as the same result can be obtained.

Each of the above configurations, functions, processing units, processing methods and the like may be embodied by hardware, for example, by designing a part or all thereof with an integrated circuit. Each of the above configurations, functions, and the like may be embodied by software by a processor interpreting and executing a program that embodies each function. Information such as programs, tables, and files that embody each function can be stored in a memory, a hard disk, a storage unit such as a solid state drive (SSD), an IC card, a semiconductor recording medium, a magnetic recording medium, or an optical recording medium.

Control lines and information lines indicate what is considered necessary for explanation, and not all control lines and information lines on the product are necessarily shown. In practice, it can be considered that almost all configurations are interconnected.

What is claimed is:

1. A method of managing a server of using a plurality server resources managed by being divided into a plurality of categories in a predetermined standard, selecting an active system and a standby system from different categories, and redundantly disposing the service providing server, the method comprising:

a step of acquiring and storing selection information that is information necessary for selecting the category;

a step of acquiring and storing failure information indicating a failure occurring in the category;

a selection step of newly selecting an additional category based on an occurrence situation of failure according to the active system and/or the standby system; and a selection result output step of outputting a category selected in the selection step, wherein in the selection step, for the category satisfying a condition indicated by the selection information, an additional category is selected with reference to the failure information.

* * * * *